United States Patent
Chang et al.

(10) Patent No.: US 9,520,773 B2
(45) Date of Patent: Dec. 13, 2016

(54) ANTI-LEAKAGE SUPPLY CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Gui Chang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 138 days.

(21) Appl. No.: 14/600,724

(22) Filed: Jan. 20, 2015

(65) Prior Publication Data

US 2016/0197548 A1    Jul. 7, 2016

(30) Foreign Application Priority Data

Jan. 6, 2015   (CN) .......................... 2015 1 0004328

(51) Int. Cl.
   *H02M 1/36*      (2007.01)
   *H02M 3/04*      (2006.01)
   *H02M 3/156*     (2006.01)
   *G05F 1/44*      (2006.01)

(52) U.S. Cl.
   CPC .................................... *H02M 3/04* (2013.01)

(58) Field of Classification Search
   CPC ............. H02M 2001/0006; H02M 2001/0032; H02M 2001/0048; H02M 1/36; H02M 3/156; G05F 1/40; G05F 1/44
   See application file for complete search history.

(56) References Cited

U.S. PATENT DOCUMENTS

| 5,408,173 A * | 4/1995 | Knapp ................... G05F 1/575 |
|  |  | 323/282 |
| 6,960,903 B2 * | 11/2005 | Yamamoto .............. H02M 1/32 |
|  |  | 323/282 |
| 2008/0024097 A1 * | 1/2008 | Komiya .................. H02M 3/07 |
|  |  | 323/275 |

* cited by examiner

Primary Examiner — Gary L Laxton
(74) Attorney, Agent, or Firm — Zhigang Ma

(57) ABSTRACT

An anti-leakage supply circuit includes a power supply unit, an output unit, a control unit, and a control circuit. The control unit is configured to output a control signal. The output unit is configured to be switched on after receiving the control signal and to output an output voltage after being switched on and receiving a voltage from the power supply unit. The control circuit is configured to be switched on after an electronic device is in a normal state. The output unit is configured to connect to the interface after the control circuit is switched on, thereby enabling the output unit to output the output voltage to supply to an interface. The control circuit is further configured to be switched off after the electronic device is in a shutdown state, thereby disabling the output voltage supply to the interface.

20 Claims, 2 Drawing Sheets

ANTI-LEAKAGE SUPPLY CIRCUIT

CROSS-REFERENCE TO RELATED APPLICATIONS

This application claims priority to Chinese Patent Application No. 201510004328.5 Jan. 6, 2015, the contents of which are incorporated by reference herein.

FIELD

The subject matter herein generally relates to power conservation.

BACKGROUND

An anti-leakage supply circuit may be used to prevent an interface from leakage to ground.

BRIEF DESCRIPTION OF THE DRAWINGS

Implementations of the present technology will now be described, by way of example only, with reference to the attached figures.

DETAILED DESCRIPTION

Figure 1:
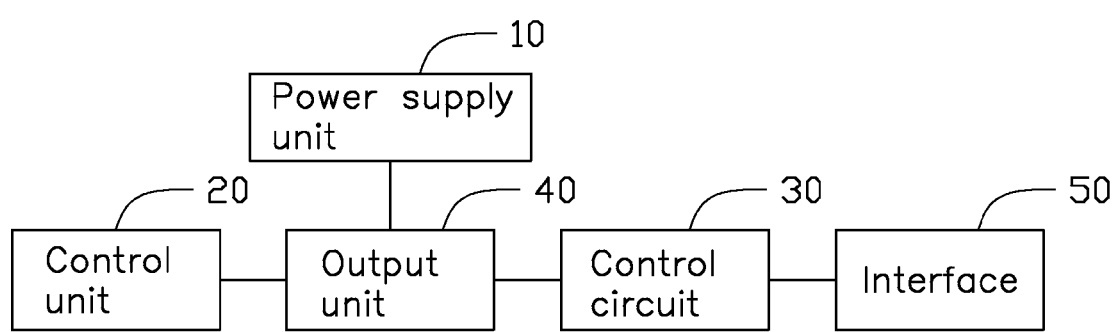
FIG. 1 is a block diagram of one embodiment of an anti-leakage supply circuit and an interface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to an anti-leakage supply circuit configured to prevent an interface from leaking current to ground when a computer is in a shutdown state.

FIG. 1 illustrates an embodiment of an anti-leakage supply circuit. The anti-leakage supply circuit is used in an electronic device and comprises a power supply unit 10, a control unit 20, a control circuit 30, and an output unit 40 coupled to the power supply unit 10. The control unit 20 is coupled to the output unit 40. The control circuit 30 is configured to couple to an interface 50.

The control circuit 30 is configured to control power supply to the interface 50 according to a working state of the electronic device. In one embodiment, the working state of the electronic device comprises a normal state (SO state) and a shutdown state (S5 state). The power supply unit 10 is configured to supply a supply voltage. The control unit 20 is configured to output a control signal. The output unit 40 is configured to be switched on after receiving the control signal. The output unit 40 is also configured to output an output voltage after being switched on and receiving the supply voltage. The control circuit 30 is configured to be switched on after the electronic device goes into normal state. The output unit 40 is configured to connect to the interface 50 after the control circuit 30 is switched on, thereby enabling the output unit 40 to output voltage to supply the interface 50. The control circuit 30 is further configured to be switched off after the electronic device goes into a shutdown state, thereby disabling the output voltage from the output unit 40 to the interface 50.

In one embodiment, the power supply unit 10 is configured to supply the 5V supply voltage, the output unit 40 is a switch, in the embodiment, the switch 40 is TPS2296, the interface 50 is a HDMI interface, and the electronic device can be a computer, which comprises a HDMI interface.

Figure 2:
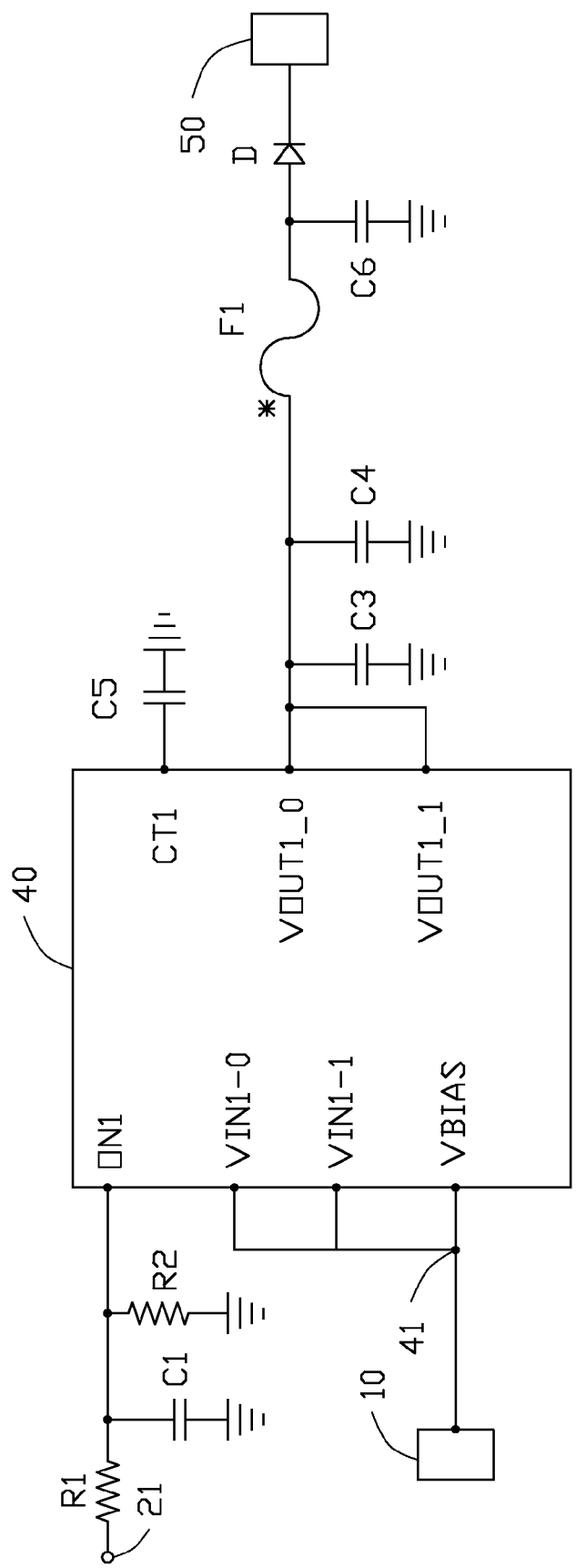
FIG. 2 is a circuit diagram of the anti-leakage supply circuit and the interface of FIG. 1.

FIG. 2 illustrates that the control unit 20 comprises a power supply 21, a first resistor R1, a first capacitor C1, and a second resistor R2.

The control circuit 30 comprises a fuse F1 and a switch member D. In one embodiment, the switch member D is a silicon diode.

The output unit 40 comprises a switch terminal ON1, a first input terminal VIN1_0, a second input terminal VIN1_1, a first output terminal VOUT1_0, a second output terminal VOUT1_1, a control terminal CT1, a bias voltage terminal VBIAS.

The switch terminal ON1 of the output unit 40 is coupled to the power supply 21 via the first resistor R1. The switch terminal ON1 of the output unit 40 is grounded via the first capacitor C1. The switch terminal ON1 of the output unit 40 is grounded via the second resistor R2. The first input terminal VIN1_0, the second input terminal VIN1_1, and the bias voltage terminal VBIAS of the output unit 40 are coupled to a first node 41. The first node 41 is grounded via a second capacitor C2. The first node 41 is coupled to the power supply unit 10. The first output terminal VOUT1_0 and the second output terminal VOUT1_1 of the output unit 40 are coupled to a second node 43. The second node 43 is grounded via a third capacitor C3 and is grounded via a fourth capacitor C4. The control terminal CT1 of the output unit 40 is grounded via a fifth capacitor C5. The second node 43 is coupled to one end of a fuse F1. The other end of the fuse F1 is coupled to one end of a sixth capacitor C6. The other end of the sixth capacitor C6 is grounded. An anode of the silicon diode D is grounded via the sixth capacitor C6. A cathode of the silicon diode D is coupled to the interface 50.

The power supply unit 10 is configured to output the 5V supply voltage to the output unit 40. The control unit 20 is configured to send a control signal to the output unit 40, thereby enabling the output unit 40 to be switched on. The output unit 40 outputs a 5V output voltage after being switched on and receiving the control signal. The 5V output voltage is supplied to the interface 50 via the control circuit 30.

The silicon diode D is switched on when the electronic device is in the normal state, thereby enabling the control circuit 30 to be switched on. The output unit 40 is connected to the interface 50 via the control circuit 30. The output unit 40 outputs the 5V output voltage. The 5V output voltage is supplied to the interface 50 via the control circuit 30.

The silicon diode D is switched off when the electronic device is in the S5 state, thereby enabling the control circuit 30 to be switched off. The output unit 40 is disconnected from the interface 50. The output unit 40 is not capable of supplying voltage to the interface 50, thereby any leakage to ground is avoided.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. An anti-leakage supply circuit comprising:
    a power supply unit configured to supply a supply voltage;
    an output unit coupled to the power supply unit;
    a control unit coupled to the output unit; and
    a control circuit couplable to an interface and the output unit;
    wherein the control unit is configured to output a control signal;
    wherein the output unit is configured to be switched on upon receiving the control signal, and to output an output voltage after being switched on and receiving the supply voltage;
    wherein the output unit is also configured to output an output voltage after being switched on and receiving the supply voltage;
    wherein the control circuit is further configured to be switched on after an electronic device is in a normal state;
    wherein the output unit is further configured to connect to the interface after the control circuit is switched on, thereby enabling the output unit to output the output voltage to supply to the interface; and
    wherein the control circuit is further configured to be switched off after the electronic device is in a shutdown state, thereby disabling the output voltage from the output unit to the interface.

2. The supply circuit of claim 1, wherein the control circuit comprises a switch member, one end of the switch member is coupled to the output unit, the other end of the switch member is configured to couple to the interface, and the switch member is configured to disconnect the output unit and the interface when the electronic device is shutdown.

3. The supply circuit of claim 2, wherein the output unit comprises an output terminal coupled to a first node and the first node is coupled to one end of the switch member.

4. The supply circuit of claim 3, wherein the switch member is a silicon diode, the first node is coupled to an anode of the silicon diode, and the cathode of the silicon diode is configured to couple to the interface.

5. The supply circuit of claim 4, wherein the control circuit further comprises a fuse, the first node is coupled to one end of the fuse, and the other end of the fuse is coupled to the anode of silicon diode.

6. The supply circuit of claim 5, wherein one end of the fuse is grounded via a first capacitor, the other end of the fuse is grounded via a second capacitor.

7. The supply circuit of claim 6, wherein the anode of the silicon diode is grounded via the second capacitor.

8. The supply circuit of claim 3, wherein the output unit further comprises an input terminal coupled to a second node and the second node is coupled to the power supply unit.

9. The supply circuit of claim 3, wherein the control unit comprises a power supply and the output unit further comprises a control terminal coupled to the power supply via a first resistor.

10. The supply circuit of claim 9, wherein the control terminal of the output unit is grounded via a second resistor.

11. An anti-leakage supply circuit being used in an electronic device and comprising:
    an interface;
    a power supply unit configured to supply a supply voltage;
    an output unit coupled to the power supply unit;
    a control unit coupled to the output unit; and
    a control circuit coupled to the output unit and the interface;
    wherein the control unit is configured to output a control signal;
    wherein the output unit is configured to be switched on upon receiving the control signal;
    wherein the output unit is also configured to output an output voltage after being switched on and receiving the supply voltage;
    wherein the control circuit is configured to be switched on after the electronic device is in a normal state;
    wherein the output unit is configured to connect to the interface after the control circuit is switched on, thereby the output unit outputs the output voltage to supply to the interface; and
    wherein the control circuit is further configured to be switched off after the electronic device is in a shutdown state, thereby disabling the output voltage from the output unit to the interface.

12. The supply circuit of claim 11, wherein the control circuit comprises a switch member, one end of the switch member is coupled to the output unit, the other end of the switch member is coupled to the interface, and the switch member is configured to disconnect the output unit and the interface when the electronic device is shutdown.

13. The supply circuit of claim 12, wherein the output unit comprises two output terminals coupled to a first node and the first node is coupled to one end of the switch member.

14. The supply circuit of claim 13, wherein the switch member is a silicon diode, the first node is coupled to an anode of the silicon diode, and the cathode of the silicon diode is configured to couple to the interface.

15. The supply circuit of claim 14, wherein the control circuit further comprises a fuse, the first node is coupled to one end of the fuse, and the other end of the fuse is coupled to the anode of silicon diode.

16. The supply circuit of claim 15, wherein one end of the fuse is grounded via a first capacitor, the other end of the fuse is grounded via a second capacitor.

17. The supply circuit of claim 11, wherein the output unit is a switch and a type of the output unit is TPS2296.

18. The supply circuit of claim 11, wherein the interface is a HDMI interface.

19. The supply circuit of claim 13, wherein the output unit further comprises two input terminals coupled to a second node and the second node is coupled to the power supply unit.

20. The supply circuit of claim 13, wherein the control unit comprises a power supply and the output unit further comprises a control terminal coupled to the power supply via a resistor.

* * * * *